United States Patent [19]

Suzuki

[11] Patent Number: 5,218,764

[45] Date of Patent: Jun. 15, 1993

[54] METHOD OF MANUFACTURING A ROTARY BEARING ASSEMBLY HAVING AN INSERTION HOLE

[75] Inventor: Osamu Suzuki, Yokohama, Japan

[73] Assignee: Nippon Thompson Co., Ltd., Tokyo, Japan

[21] Appl. No.: 703,229

[22] Filed: Jun. 4, 1991

Related U.S. Application Data

[62] Division of Ser. No. 548,160, Jul. 5, 1990, Pat. No. 5,033,873.

[30] Foreign Application Priority Data

Jul. 5, 1989 [JP] Japan .................................. 1-172056

[51] Int. Cl.$^5$ ............................................... F16C 33/00
[52] U.S. Cl. ............................ 29/898.066; 29/898.063; 29/557; 29/559; 51/291; 51/324
[58] Field of Search ............ 29/898.066, 898.063, 29/557, 559; 51/290, 291, 324; 384/447, 508, 617, 559, 619, 620

[56] References Cited

U.S. PATENT DOCUMENTS

| | | | |
|---|---|---|---|
| 2,913,859 | 11/1959 | Koch | 51/291 |
| 3,148,922 | 9/1964 | Roessler, Jr. | 384/508 |
| 4,567,695 | 2/1986 | Schaeffler | 51/291 |
| 4,568,205 | 2/1986 | Basener | 384/508 X |
| 4,606,654 | 8/1986 | Yatsu et al. | 384/447 |
| 4,656,789 | 4/1987 | Schwar | 51/291 X |
| 4,788,758 | 12/1988 | Gordon et al. | 51/291 X |
| 4,854,750 | 8/1989 | Lavin | 384/447 X |
| 4,961,653 | 10/1990 | Suzuki et al. | 384/447 |
| 5,026,177 | 6/1991 | Masuda | 384/447 |

FOREIGN PATENT DOCUMENTS

308061 6/1955 Switzerland .

*Primary Examiner*—Mark Rosenbaum
*Assistant Examiner*—S. Thomas Hughes
*Attorney, Agent, or Firm*—Skjerven, Morrill, MacPherson, Franklin & Friel

[57] ABSTRACT

A rolling contact type rotary bearing assembly includes a pair of inner and outer rings and a plurality of rolling members interposed therebetween. When an insertion hole for feeding the rolling members into a guide space defined between the inner and outer rings is provided in an inner ring, a recessed portion is formed in the outer guide surface of the inner ring over a predetermined distance around the inertion hole such that the end surface of the plug defines a part of and flush with the guide surface of the inner ring when set in position in the insertion hole. Such a recessed portion can also be provided in the outer ring.

2 Claims, 4 Drawing Sheets

METHOD OF MANUFACTURING A ROTARY BEARING ASSEMBLY HAVING AN INSERTION HOLE

This application is a division of application Ser. No. 07/548,160, filed Jul. 05, 1990, now U.S. Pat. No. 5,033,873.

BACKGROUND OF THE INVENTION

1. Field of the Invention

This invention generally relates to a rotary bearing assembly and in particular to a rolling contact type rotary bearing assembly including a pair of inner and outer rings and a plurality of rolling members interposed between the inner and outer rings.

2. Description of the Prior Art

A rotary bearing assembly having a plurality of rollers as the rolling members is disclosed in the U.S. Pat. No. 4,606,654 which is assigned to the assignee of this application and which is hereby incorporated by reference. In the structure disclosed in this U.S. Pat. No. 4,606,654, an insertion hole for inserting a plurality of rollers into a space between a pair of inner and outer rings is provided in the outer ring and the insertion hole has a shape which is slightly larger than the diameter of the roller at its inlet and which gradually flares out toward the space between the inner and outer rings. In this structure, the outer ring can be made thinner without imparing its strength and structural integrity and the bearing assembly can be made smaller in size. However, in this structure, since a gap is defined between a plug inserted into the insertion hole after feeding a required number of rollers into the space between the outer and inner rings and the outer ring because of the flared out shape of the insertion hole, the guide surface of the outer ring along which the rollers role is not smooth so that the rollers tend to strike against the tip end of the plug when they roll. In addition, since the insertion hole has a flared-out structure, difficulty is encountered in manufacture.

In order to cope with this situation, there has been proposed an improved crossed roller bearing assembly having an insertion hole as disclosed in the U.S. patent application No. 07/329,928, which was filed on Mar. 29, 1989, now U.S. Pat. No. 4,961,653. and which is assigned to the assignee of this application and is hereby incorporated by reference. In accordance with the teachings of this U.S. Patent Application, a plug is snugly fitted into an insertion hole provided in either one of inner and outer rings of a bearing assembly such that the end of the plug is located slightly short of a V-shaped guide surface of the ring in which the insertion hole is provided. Such a structure is no doubt advantageous in reducing the rolling resistance since none of the rollers does not come into direct engagement with the tip end of the plug. However, when such a bearing assembly was used in a large-sized robot or the rotating table of a crane, it was found that an relatively increased rolling resistance often resulted. In addition, when such a bearing assembly was used in a high precision machine, appreciable fluctuations occurred in the rotating torque. Besides, there was some difficulty in manufacturing such a bearing assembly, particularly in setting the tip end of a plug slightly short of the guide surface of the ring.

SUMMARY OF THE INVENTION

In accordance with the present invention, there is provided a rotary bearing assembly which includes a pair of inner and outer rings, between which a guide space is defined, and a plurality of rolling members, such as rollers and balls, which are disposed in the guide space to thereby allow one of the outer and inner rings to rotate relative to the other. Either one of the outer and inner rings is provided with an insertion hole for feeding a required number of rolling members to be fed into the guide space between the inner and outer rings. The assembly also includes a plug for plugging the insertion hole after feeding the required number of rollers into the guide space and the plug has an outer shape which substantially corresponds to the shape of the insertion hole. In the preferred embodiment, the insertion hole is generally cylindrical in shape and the plug is also generally cylindrical in shape so that when the plug is fit into the insertion hole, the plug is snugly fit into the insertion hole, thereby defining no gap between that of the inner and outer rings in which the insertion hole is provided and the plug. In the preferred embodiment, the plug has a tip end which defines a part of a guide surface of a ring, along which the rolling members roll, and the guide surface of the ring, in which the insertion hole is provided, is slightly recessed smoothly circumferentially over a predetermined distance around the insertion hole. With the provision of such a gradual and smooth recess along the guide surface of the ring in which the insertion hole is provided, the tip end of the plug snugly fit into the insertion hole may be located substantially flush with the recessed guide surface of the ring. It is to be noted that such an insertion hole may be provided either one of or both of the inner and outer rings.

It is therefore a primary object of the present invention to obviate the disadvantages of the prior art as described above and to provide an improved rolling contact type rotary bearing assembly.

Another object of the present invention is to provide an improved rotary bearing assembly including an insertion hole for feeding a plurality of rolling members into a guide space defined between a pair of inner and outer rings.

A further object of the present invention is to provide an improved rotary bearing assembly smooth in operation and low in rolling resistance.

A still further object of the present invention is to provide an improved rotary bearing assembly compact in size and low at cost.

A still further object of the present invention is to provide a novel method for manufacturing a rotary bearing assembly having an insertion hole.

Other objects, advantages and novel features of the present invention will become apparent from the following detailed description of the invention when considered in conjunction with the accompanying drawings.

DESCRIPTION OF THE PREFERRED EMBODIMENTS

Figure 1:
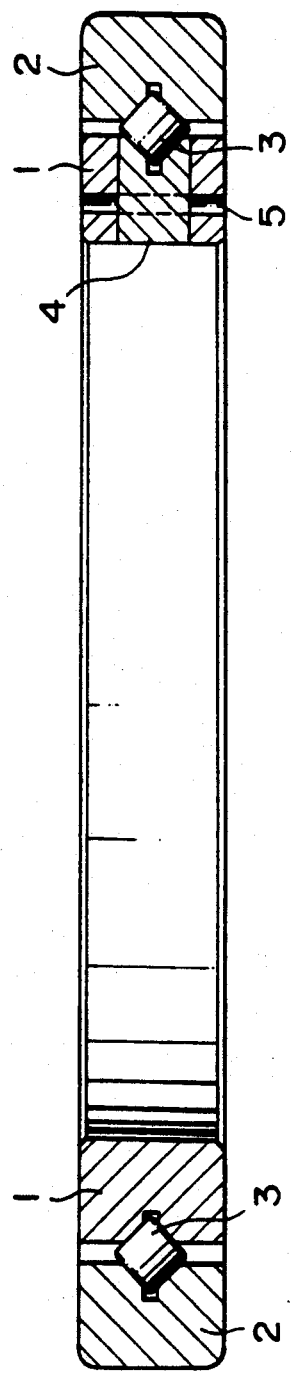
FIG. 1 is an axial cross-sectional view showing a rotary bearing assembly constructed in accordance with one embodiment of the present invention.

Referring now to FIG. 1, there is schematically shown in an axial cross section a rolling contact type rotary bearing assembly constructed in accordance with one embodiment of the present invention. As shown, the present rotary bearing assembly generally includes an inner ring 1, an outer ring 2 and a plurality of rolling members 3 interposed between the inner and outer rings 1 and 2. In the illustrated embodiment, the inner ring 1 has an outer peripheral surface which is formed with an inner V-shaped guide groove 1a which extends circumferentially. On the other hand, the outer ring 2 has an inner peripheral surface which is formed with a V-shaped guide groove which also extends circumferentially. When assembled, the V-shaped guide grooves of the inner and outer rings 1 and 2 are located opposite to each other to thereby define a circular guide space. The rolling members (or cylindrical rollers in the illustrated embodiment) 3 are provided in this guide space to provide a rolling contact between the inner and outer rings 1 and 2, so that either of the inner and outer rings 1 and 2 may rotate in either direction relative to the other through the rolling members 3.

In the illustrated embodiment, the inner ring 1 is formed with an insertion hole for feeding a required number of rollers 3 into the guide space. In this case, the size of the insertion hole is preferably set as small as practically possible. In the preferred embodiment, the insertion hole has a diameter which is larger than the diameter of the roller 3, but smaller than the diagonal length in cross section of the roller 1. No such insertion hole is provided in the outer ring 2 in the illustrated embodiment, though one or more such insertion holes may also be provided in the outer ring 2, if desired. A plug 4 is snugly fit into the insertion hole and the plug 4 is fixed in position by a pin 5. As shown in FIG. 1, the plug 4 has a tip end which defines a part of the inner V-shaped guide surface of the inner ring 1. As will be described more in detail later, it should be noted that the tip end of the plug 4 is substantially flush with the inner V-shaped guide surface of the inner ring 1 without appreciable abrupt step around the tip end of the plug 4.

Figure 2:
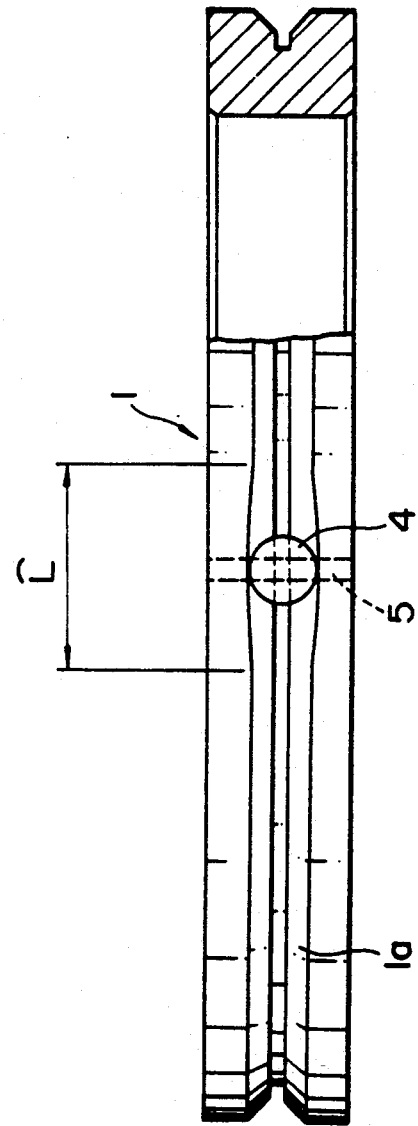
FIG. 2 is a partially cut-away view of the inner ring used in the assembly shown in FIG. 1.
Figure 3:
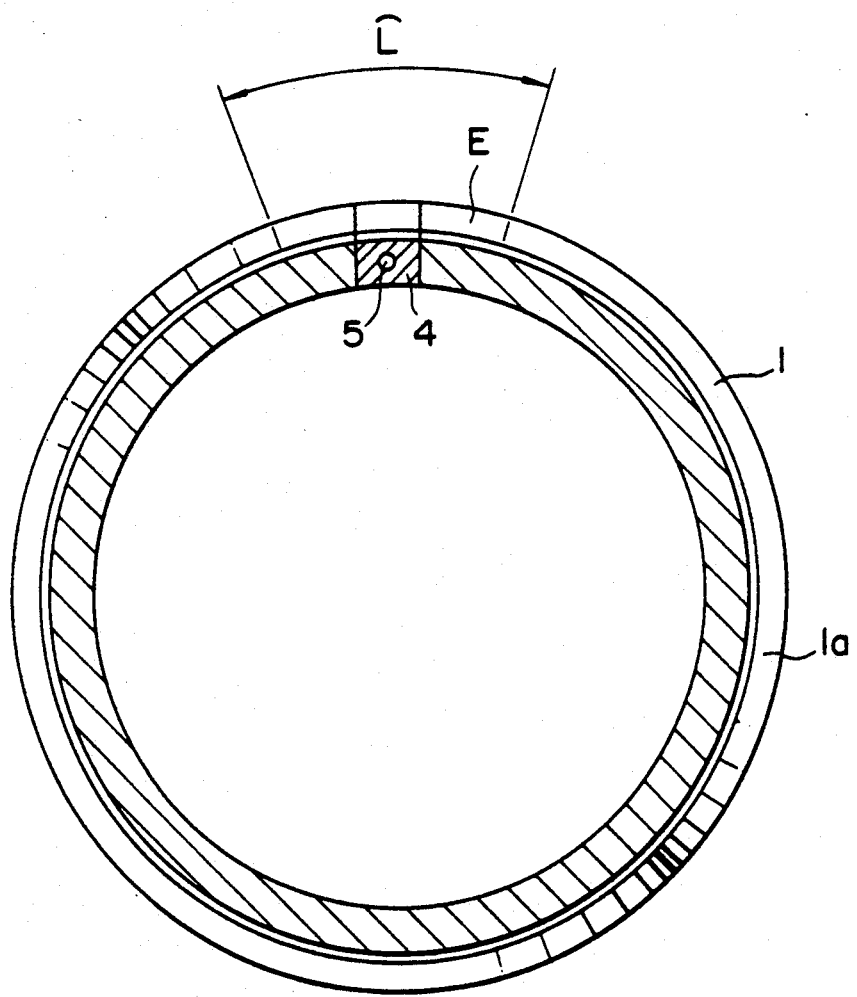
FIG. 3 is a cross-sectional plan view of the inner ring used in the assembly shown in FIG. 1.

Referring to FIG. 2, in accordance with the present invention, the inner V-shaped guide surface 1a of the inner ring 1 is locally recessed smoothly and at least radially, for example, by deforming, grinding or any kind of machining processes over a predetermined distance L along the inner V-shaped guide surface 1a of the inner ring 1 around the insertion hole. In the preferred embodiment, the insertion hole is located substantially in the middle of the distance L. As shown in FIG. 3, the inner V-shaped guide surface 1a of the inner ring 1 is slightly recessed radially over an arc-shaped distance L around the insertion hole so that the actual location of the inner V-shaped guide surface 1a is somewhat inward of a hypothetical location without such a recess. In the preferred embodiment, the recess gradually increases from one end toward the middle where the insertion hole is located and then the recess E gradually diminishes as one approaches the opposite end of the recessed portion. Thus, the tip end of the plug 4 defines a part of or bottom of the recessed portion of the inner V-shaped guide surface 1a. As a result, the overall inner V-shaped guide surface 1a is substantially uniformly smooth along its entire circumference, which allows to obtain a significantly reduced rolling resistance.

Figure 4:
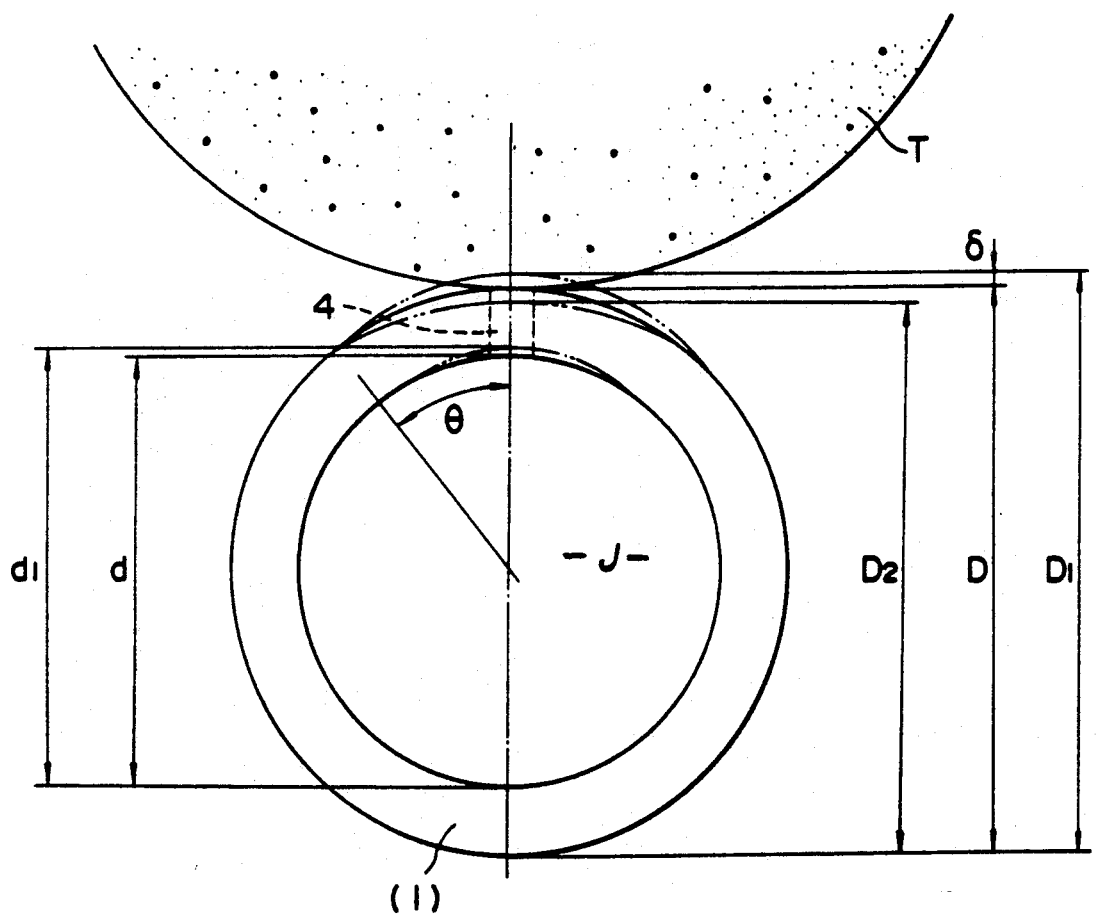
FIG. 4 is a schematic illustration showing a method for manufacturing a rotary bearing assembly in accordance with one embodiment of the present invention.

Referring now to FIG. 4, a method for manufacturing the present rotary bearing assembly shown in FIGS. 1-3 in accordance with one embodiment of the present invention is illustrated. As shown, in accordance with the present invention, a work (1), having the plug 4 fit in position in the insertion hole, to be processed is first press-fitted onto a cylindrical jig J, for example a mandrel having a local projecting section (dash-dot line) which projects radially outwardly over a predetermined angle $2\theta$ and of a height $d_{1-d}$ below plug 4. As a result, the work (1) becomes locally projected to define a maximum diameter $D_1$. Then, the work (1) is subjected to processing, such as grinding by grinding weel T, until the maximum outer diameter reaches D. Since only those portions which projected outwardly beyond D have been ground, the resulting inner ring 1 has a locally recessed portion when the inner ring 1 thus processed is removed from the jig. In this manner, simply by providing a recessed portion around the insertion hole of the inner ring 1 along its circumferential guide groove with the plug 4 in position in the insertion hole, a smoothly varying recessed portion is defined along the guide surface 1a of the inner ring 1. In the preferred embodiment, the insertion hole is located in alignment with the projecting portion of the jig.

In FIG. 4, delta indicates an amount of projection which is to be processed. As a rule of thumb, delta can preferably be set in the order of elastic deformation of the ring when a half of fundamental rated load C has been applied thereto. And, the angle of $2\theta$ can be preferably set to be equal to or less than 90°.

Figure 5:
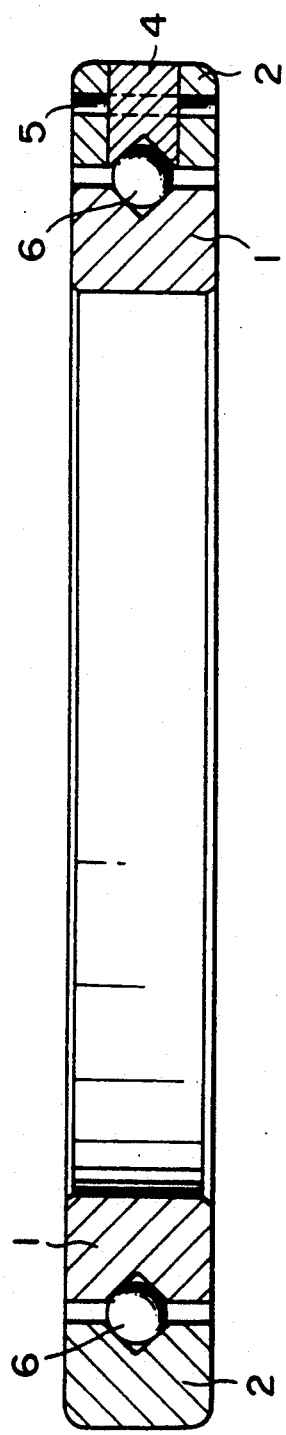
FIG. 5 is an axial cross-sectional view showing a rotary bearing assembly constructed in accordance with another embodiment of the present invention.

FIG. 5 illustrates a rolling contact type rotary bearing assembly constructed in accordance with another embodiment of the present invention, and the present rotary bearing assembly is similar in many respects to the previously described embodiment. However, in the present embodiment, use is made of balls 6 as the rolling members instead of rollers, and the insertion hole is provided in the outer ring 2 in place of the inner ring 1. In manufacturing the outer ring 2 having such insertion hole, a work to be processed is fitted into a cylindrical jig having a projecting portion which projects radially inwardly locally, and the inner peripheral surface of the work is ground. Then, when the work thus processed is removed from the jig, there is formed a recessed portion along the inner peripheral surface over a predetermined distance circumferentially.

While the above provides a full and complete disclosure of the preferred embodiments of the present invention, various modifications, alternate constructions and equivalents may be employed without departing from the true spirit and scope of the invention. For example, use has been made of a pin as the fixing means for fixing the plug in position in the insertion hole in the above-described embodiments, any other fixing means can also be used. Therefore, the above description and illustration should not be construed as limiting the scope of the invention, which is defined by the appended claims.

What is claimed is:

1. A method of manufacturing an inner ring for use in assembling a rotary bearing assembly including a pair of inner and outer rings and a plurality of rolling members interposed therebetween, comprising the steps of:

preparing a substantially cylindrical work to be processed and having an insertion hole extending in a radial direction with respect to a center line of said work for inserting rolling members;

inserting a removable plug into said insertion hole and having said plug fixed in position in said insertion hole;

press-fitting said work onto a substantially cylindrical jig having a locally outwardly projecting portion, said portion projecting radially outwardly from an outer peripheral surface of said jig, such that a portion of said work becomes locally projected around said insertion hole and wherein said insertion hole is substantially located in alignment with said jig projecting portion;

grinding an outer peripheral surface of the locally projected portion of said work until a predetermined shape and recess around the insertion hole is obtained; and removing said work thus ground from said jig.

2. A method of manufacturing an outer ring for use in assembling a rotary bearing assembly including a pair of inner and outer rings and a plurality of rolling members interposed therebetween, comprising the steps of:

preparing a substantially cylindrical work to be processed and having an insertion hole extending in a radial direction with respect to a center line of said work for inserting rolling members;

inserting a removable plug into said insertion hole and having said plug fixed in position in said insertion hole;

press-fitting said work into a substantially cylindrical hollow jig having a locally inwardly projecting portion, said portion projecting radially inwardly from an inner peripheral surface of said jig, such that a portion of said work becomes locally projected around said insertion hole and said insertion hole is substantially located in alignment with said jig projecting portion;

grinding an inner peripheral surface of the locally projected portion of said work until a predetermined shape and recess around the insertion hole is obtained; and removing said work thus ground from said jig.

* * * * *